United States Patent [19]

Sata et al.

[11] Patent Number: 5,134,499
[45] Date of Patent: Jul. 28, 1992

[54] VIDEO RECORDING APPARATUS HAVING CONTROL MEANS PROVIDED THEREIN FOR INDEPENDENTLY CONTROLLING THE WRITING HEAD AND THE READING HEAD

[75] Inventors: Takeo Sata; Kenzaburo Iijima; Katsufumi Kondo; Nobuji Kato, all of Hamamatsu, Japan

[73] Assignee: Yamaha Corporation, Hamamatsu, Japan

[21] Appl. No.: 388,831

[22] Filed: Aug. 3, 1989

[30] Foreign Application Priority Data

Aug. 4, 1988 [JP] Japan ................................. 63-195129
Aug. 26, 1988 [JP] Japan ................................. 63-211793
Aug. 26, 1988 [JP] Japan ................................. 63-211794

[51] Int. Cl.$^5$ ............................................. H04N 5/76
[52] U.S. Cl. ................................. 358/342; 358/335; 358/314; 358/327; 358/336; 369/32; 369/54
[58] Field of Search ............... 358/314, 327, 335, 336, 358/339, 342; 369/32, 54; 360/5, 6, 31, 33.1, 36.2, 38.1, 72.1, 78.04, 78.11

[56] References Cited

U.S. PATENT DOCUMENTS 4,805,162  2/1989  Stahl et al. ............................ 369/44
4,905,093  2/1990  Satoh ................................. 358/335

Primary Examiner—Roy N. Envall, Jr.
Assistant Examiner—Robert Chevalier
Attorney, Agent, or Firm—Burns, Doane, Swecker & Mathis

[57] ABSTRACT

A video recording apparatus used for a television system and the like writes video information on a track formed on a recording medium in a writing direction which directs from a predetermined start position to a predetermined end position of track by use of a head. Thereafter, the video information is read from a desirable designated positon of the track in the writing direction. The read video information is reproduced and then its corresponding pictures are displayed on a display unit of the television system. This video information is not outputted from the recording medium in a period while the head returns to the predetermined start position of the track after the video information at the predetermined end position of the track is read out. So, this video recording apparataus can provide a memory which stores the video information and then outputs the video information during such period. Thus, the video information can be continuously obtained. Preferably, the recording medium is constructed by an optical disk or an magneto-optical disk, the memory is constructed by a semiconductor memory such as a random-access memory (RAM), and the predetermined start and end positions are innermost side and outermost side of the track.

15 Claims, 5 Drawing Sheets

VIDEO RECORDING APPARATUS HAVING CONTROL MEANS PROVIDED THEREIN FOR INDEPENDENTLY CONTROLLING THE WRITING HEAD AND THE READING HEAD

BACKGROUND OF THE INVENTION

1. Field of the Invention

The present invention relates to a video recording apparatus, and more particularly to a video recording apparatus which is suitable to be used for recording/reproducing picture information of a television system.

2. Prior Art

In order to record/reproduce the video information of the television programs, a video tape recorder (VTR) or video cassette recorder (VCR) is used in general. In order to play the recorded video information after recording the television program, the video tape is rewound back and then the video information is reproduced from its start part.

In some cases, it is demanded that the precedingly recorded video information is reproduced even in the middle of the recording. However, the VTR can not reproduce the recorded video information in the recording normally. So, in order to watch the precedingly recorded video information in the middle of the recording, the recording of the VTR must be broken. Meanwhile, people sometimes want to break the recording of the television program, for example. In this case, however, certain recorded part of the television program which people want to watch must be reproduced after the television program ends.

In the VTR, the rewinding of the video tape requires much time. So, in the case where the certain recorded part is repeatedly reproduced, it is disadvantageous in that the conventional video recording apparatus requires much time.

SUMMARY OF THE INVENTION

It is accordingly a primary object of the present invention to provide a video recording apparatus which does not require much time when repeatedly reproducing the desirable recorded part.

In a first aspect of the present invention, there is provided a video recording apparatus capable of recording at least video information on a recording medium comprising:

(a) write control means for controlling a motion of a head to write the video information on a track formed on the recording medium in a writing direction which directs from a predetermined start position to a predetermined end position in the track, the write control means returning the head to the predetermined start position of the track when the head reaches at the predetermined end position of the track; and (b) read control means for controlling the motion of the head to read the video information from a designated position of the track in the writing direction.

In a second aspect of the present invention, there is provided a video recording apparatus capable of recording at least video information on a recording medium comprising:

(a) write control means for controlling a motion of a head to write the video information on a track formed on the recording medium in a writing direction which directs from a predetermined start position to a predetermined end position in the track, the write control means returning the head to the predetermined start position of the track when the head reaches at the predetermined end position of the track;

(b) read control means for controlling the motion of the head to read the video information from a designated position of the track in the writing direction;

(c) memory means for storing the video information during a period between a first time when the head writes the video information at the predetermined end position of the track and a second time when the head starts to write the video information at the predetermined start position of the track; and (d) means for outputting the video information read from the memory means instead of the video information read from the recording medium in a period between a third time when the video information at the predetermined end position of the track is outputted and a fourth time when the video information at the predetermined start position of the track is started to be outputted.

In a third aspect of the present invention, there is provided a video recording/reproducing apparatus capable of recording/reproducing at least a video information on a recording medium comprising:

(a) compressing means for compressing digitized video data indicative of the video information into compressed video data;

(b) write means for generating a write signal based on the compressed video data, the write means controlling a motion of a head to write the write signal on a track formed on the recording medium in a writing direction which directs from a predetermined start position to a predetermined end position in the track, the write means returning the head to the predetermined start position of the track when the head reaches at the predetermined end position of the track;

(c) read means for controlling the motion of the head to read the compressed video data from a designated position of the track in the writing direction;

(d) reproducing means for reproducing the compressed video data based on an output signal of the read means; and (e) expanding means for expanding the compressed video data from the reproducing means, whereby the video information is to be reproduced based on video data outputted from the expanding means.

In a fourth aspect of the present invention, there is provided a video recording/reproducing apparatus capable of recording/reproducing at least a video information on a recording medium comprising:

(a) compressing means for compressing digitized video data indicative of the video information into compressed video data;

(b) write means for generating a write signal based on the compressed video data, the write means controlling a motion of a head to write the write signal on a track formed on the recording medium in a writing direction which directs from a predetermined start position to a predetermined end position in the track, the write means returning the head to the predetermined start position of the track when the head reaches at the predetermined end position of the track;

(c) read means for controlling the motion of the head to read the compressed video data from a designated position of the track in the writing direction;

(d) reproducing means for reproducing the compressed video data based on an output signal of the read means;

(e) expanding means for expanding the compressed video data from the reproducing means;

(f) memory means for storing the compressed video data during a period between a first time when the head writes the write signal at the predetermined end position of the track and a second time when the head starts to write the write signal at the predetermined start position of the track; and (g) means for outputting the compressed video data from the memory means to the expanding means instead of the compressed video data from the reproducing means in a period between a third time when the read means reads out the compressed video data at the predetermined end position of the track and a fourth time when the read means starts to read out the compressed video data at the predetermined start position of the track, whereby the video information is continuously reproduced based on video data outputted from the expanding means.

In a fifth aspect of the present invention, there is provided a television system employing a video recording/reproducing apparatus capable of recording/reproducing at least video information outputted from a television tuner on a recording medium comprising:

(a) write control means for controlling a motion of a head to write the video information on a track formed on the recording medium in a writing direction which directs from a predetermined start position to a predetermined end position in the track, the write control means returning the head to the predetermined start position of the track when the head reaches at the predetermined end position of the track;

(b) read control means for controlling the motion of the head to read the video information from a designated position of the track in the writing direction; and (c) selecting means for selectively outputting one of the video information from the television tuner and the video information read by the read control means, whereby a display unit the television system displays pictures corresponding to the video information outputted from the selecting means.

In a sixth aspect of the present invention, there is provided a television system employing a video recording/reproducing apparatus capable of recording/reproducing at least video information outputted from a television tuner on a recording medium comprising:

(a) write control means for controlling a motion of a head to write the video information on a track formed on the recording medium in a writing direction which directs from a predetermined start position to a predetermined end position in the track, the write control means returning the head to the predetermined start position of the track when the head reaches at the predetermined end position of the track;

(b) read control means for controlling the motion of the head to read the video information from a designated position of the track in the writing direction;

(c) memory means for storing the video information during a period between a first time when the head writes the video information at the predetermined end position of the track and a second time when the head starts to write the video information at the predetermined start position of the track;

(d) means for outputting the video information read from the memory means instead of the video information read from the recording medium in a period between a third time when the video information at the predetermined end position of the track is outputted and a fourth time when the video information at the predetermined start position of the track is started to be outputted; and (e) selecting means for selectively outputting one of the video information from the television tuner and the video information from the read control means or the means, whereby a display unit the television system displays pictures corresponding to the video information outputted from the selecting means.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings.

DESCRIPTION OF PREFERRED EMBODIMENTS OF THE PRESENT INVENTION

Figure 1:
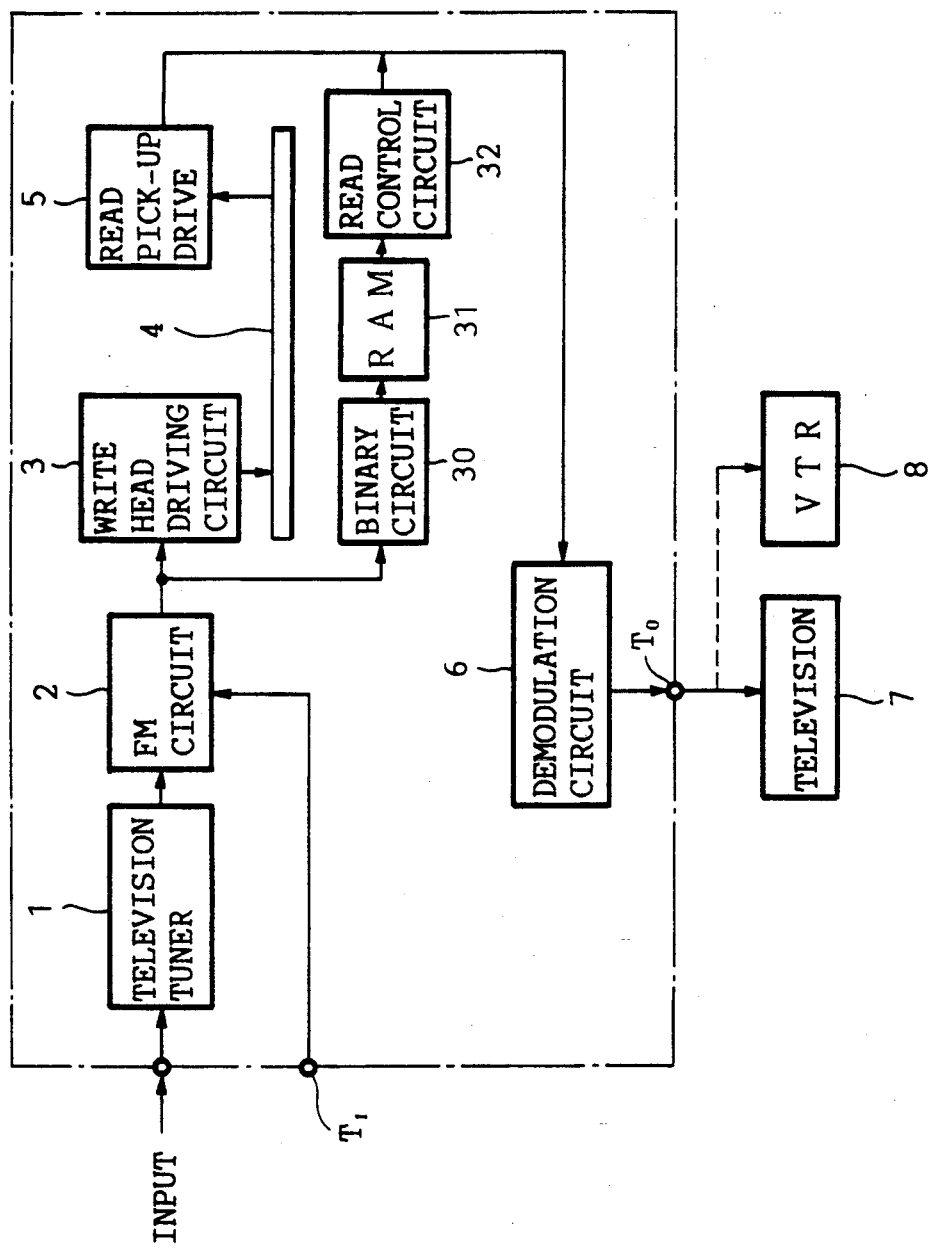
FIG. 1 is a block diagram showing a whole configuration of a television system employing the video recording apparatus according to a first embodiment of the present invention.

Next, description will be given with respect to the preferred embodiments of the present invention by referring to the drawings, wherein like reference characters designate like or corresponding parts throughout the several views.

[A] FIRST EMBODIMENT (1) Configuration Of First Embodiment

FIG. 1 is a block diagram showing the whole configuration of the television system employing the video recording apparatus according to the first embodiment of the present invention. In FIG. 1, 1 designates a television tuner which outputs a video/audio signal of the channel to be tuned. This video/audio signal is fed to a frequency modulation (FM) circuit 2 wherein this signal is modulated and then fed to a write head driving circuit 3. Meanwhile, T1 designates a terminal to which the video signal is fed from an external device such as the VTR. This video signal fed to the terminal T1 is also modulated in the FM circuit 2 and then fed to the write head driving circuit 3.

Figure 2:
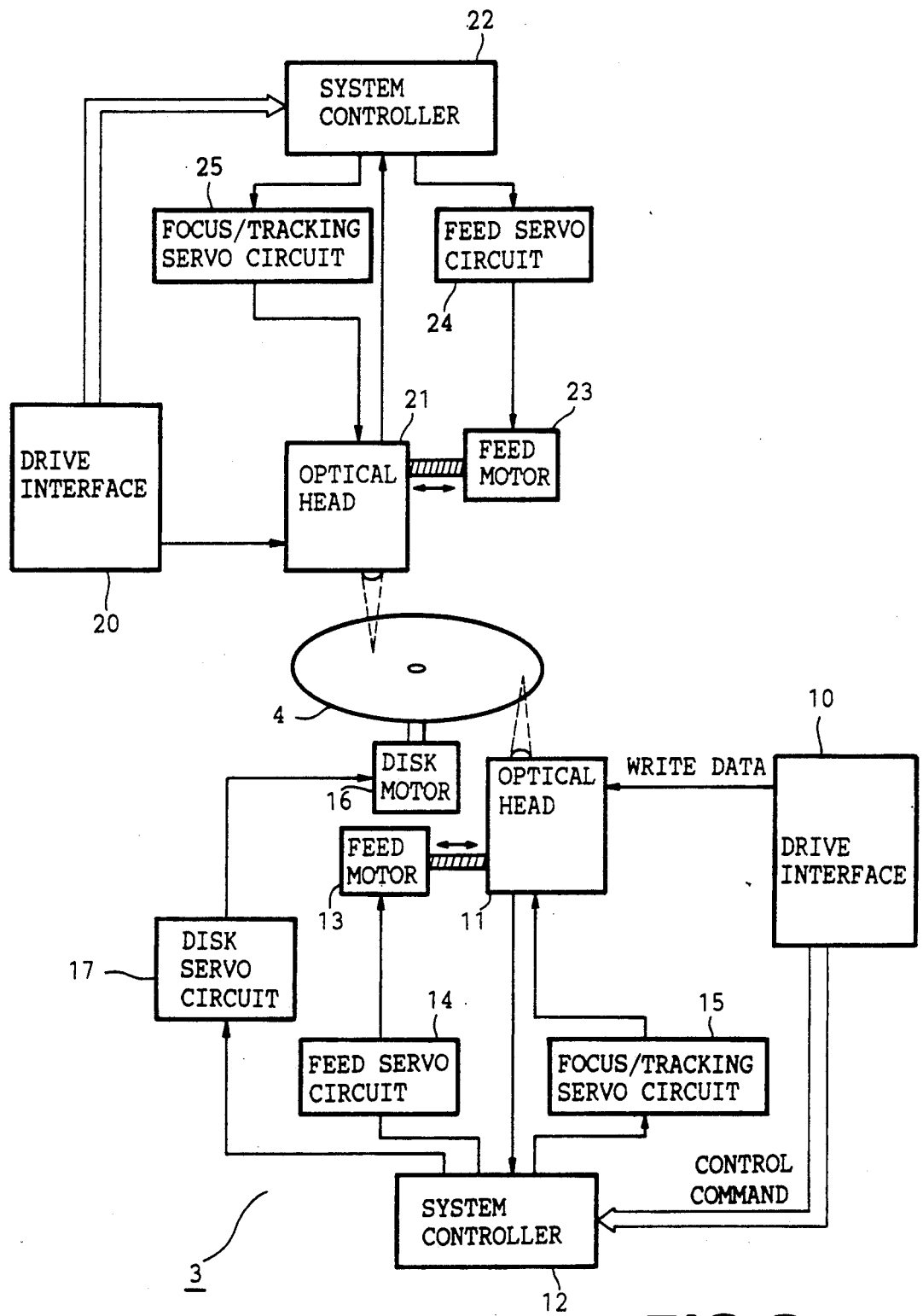
FIG. 2 is a block diagram showing an essential part of the video recording apparatus shown in FIG. 1.

The write head driving circuit 3 is configured as shown in FIG. 2. In FIG. 2, 10 designates a drive interface which mixes the FM audio signal and FM picture signal from the FM circuit 2. Then, the amplitude of such mixed signal is limited by a limiter (not shown) and then fed to a optical head 11 as write data. In addition, the drive interface 10 is designed to supply a control command to a system controller 12. Based on this control command, the system controller 12 controls the drive system of a magneto-optical disk 4. The optical head 11 controls the laser radiation based on the write data so that the pits are desirably formed along the track on the magneto-optic disk 4. This optical head 11 is driven to move in the radius direction of the disk 4 by a feed motor 13. Thus, the optical head 11 will move to accurately trace the track on the disk 4 from the innermost side to the outer side. The position data indicative of the tracking (or tracing) position of the optical head 11 is fed back to the system controller 12. Based on the feedback signal (i.e., position data to be fed back), a servo control signal is made. The servo control signal is fed to a feed servo circuit 14, which will control the revolution of the feed motor 13 based on the servo control signal. Thus, the optical head 11 will trace the track on the disk 4 with accuracy. After the optical head 11 traces the outermost side track, the system controller 12 supplies the control signal to the feed servo circuit 14 such that the optical head 11 will return and then begin to trace the track from the innermost side. As described above, the optical head 11 and its drive system are designed such that the optical head 11 will record the video/audio information on the disk 4 endlessly.

Next, under control of the system controller 12, a focus/tracking servo circuit 15 performs the focusing and tracking servo control of the optical head 11. In addition, 16 designates a disk motor which drives to revolve the magneto-optic disk 4. The data indicative of the revolution number of this disk motor 16 is fed back to the system controller 12. Based on this data, the system controller 12 generates and then supplies a servo signal to a disk servo circuit 17. Based on this servo signal, this disk servo circuit 17 controls the disk motor 16 such that its revolution number will become constant. Such constant revolution control of the disk motor 16 must be required because the optical head 11 must write the video data on the disk 4 at the constant angular speed. The above is the detailed description of the write head driving circuit 3.

Next, description will be given with respect to a read pick-up drive 5 which is configured as shown in FIG. 2. The configuration of this read pick-up drive 5 is similar to that of the write head driving circuit 3 except that the disk motor 16 and its drive system are not used. In short, 20 to 25 respectively corresponds to 10 to 15. However, this read pick-up drive 5 is activated when read command data is supplied thereto. Further, the system controller 22 is supplied with track designating data, by which the initial reading position of the optical head 21 is controlled. After the optical head 21 reaches at the track designated by the track designating data, it is controlled to move in the outer side of the track. After reading the data from the outermost side of the track (hereinafter, referred to as outermost track), the optical head 21 returns to the innermost side of the track (hereinafter, referred to as innermost track). Thereafter, the optical head 21 re-starts to read the data from the innermost side of the track.

The above-mentioned read designating data and track designating data to be fed to the system controller 22 are both generated when an operator console (not shown) is operated. The data read by the optical head 21 is fed to a demodulation circuit 6 shown in FIG. 1 as the output signal of the read pick-up drive 5. The demodulation circuit 6 demodulates this signal to thereby generate the video signal and audio signal. Then, these signals are fed to an externally provided television 7 via an output To. Incidentally, 8 designates a VTR which is used for storing the output signal of the demodulation circuit 6.

Next, 30 designates a binary circuit which converts the output signal of FM circuit 2 into binary data, which is then written into a random-access memory (RAM) 31. This binary circuit 30 operates in the period while the optical head 21 moves from the innermost track to the outermost track. The RAM 31 has the storage capacity by which all of the output signals of FM circuit 2 can be stored in the above period. The data stored in the RAM 31 is read out by a read control circuit 32 and then fed to the demodulation circuit 6. This read control circuit 32 is activated while the optical head 21 moves from the outermost track to the innermost track. Therefore, the video data which is not recorded on the disk 4 in the above period is outputted from the RAM 31 under control of the read control circuit 32. By the above-mentioned binary circuit 30, RAM 31 and read control circuit 32, the video data can be continuously stored and then outputted without any break.

(2) Operation Of First Embodiment

Next, description will be given with respect to an operation of the first embodiment.

As an example, the television 7 is connected to the output terminal To, and the same channel is tuned in both of the television tuner 1 and television 7. As described before, the write head driving circuit 3 performs the writing operation endlessly. Therefore, the magneto-optic disk 4 continuously records the video data concerning the television program of the channel tuned by the television tuner 1. In this case, when the video data is overwritten on the disk 4, the previously written video data is erased. For this reason, the amount of video data which can be recorded on the disk 4 depends on the size of disk or track density of disk. In the case where the present embodiment uses the optical disk made from Tb-Fe-Co materials and having the diameter of 30 cm, it is possible to record the video data of 30-minute television program. In the meantime, the RAM 31 writes and renews the video data during the period when the write head driving circuit 3 can not write the video data on the disk 4 as described before.

Next, when the operator console is operated so that the read command data and track position designating data are fed to the read pick-up drive 5, the read pick-up drive 5 starts to read the video data from the track position designated by the track position designating data on the disk 4. Thereafter, the reading track position is sequentially renewed by the read pick-up drive 5 so that the reading operation will be continued. In the case where the read command data is not stopped after the video data at the outermost track is completely read out, the optical head 21 searches the innermost track to thereby re-start to perform the reading operation. While the read pick-up drive 5 searches out the innermost track, the read control circuit 32 reads out the video data from the RAM 31. Thus, the demodulation circuit 6 can output the continuous video signal. When the video signal from the television tuner 1 is changed over to the video signal outputted from the demodulation circuit 6, the display unit of the television 7 displays the pictures corresponding to the video data, wherein these pictures retroact to the previous time which is prior to the current time by the period corresponding to the designated track position. As described above, by selectively reading out one of the video data recorded on the disk 4 and the video data stored in the RAM 31, it is possible to watch the previous pictures of maximum 30 minutes the moment the television tuner 1 tunes and outputs the current pictures.

For example, in contrast to the present embodiment, the conventional VTR can not replay the first 15-minute part of the 2-hour-program in the case where the person wants to record the whole part of this program. Because, the conventional VTR can merely record and reproduce the video information in serial manner. So, it takes a long time to record and then watch the recorded video information. In contrast, the present embodiment can simultaneously play back and reproduce the previous part of the television program the moment the VTR 8 continuously records the current part of the television program. So, the present embodiment does not waste the time.

(3) Modified Example of First Embodiment

Figure 3:
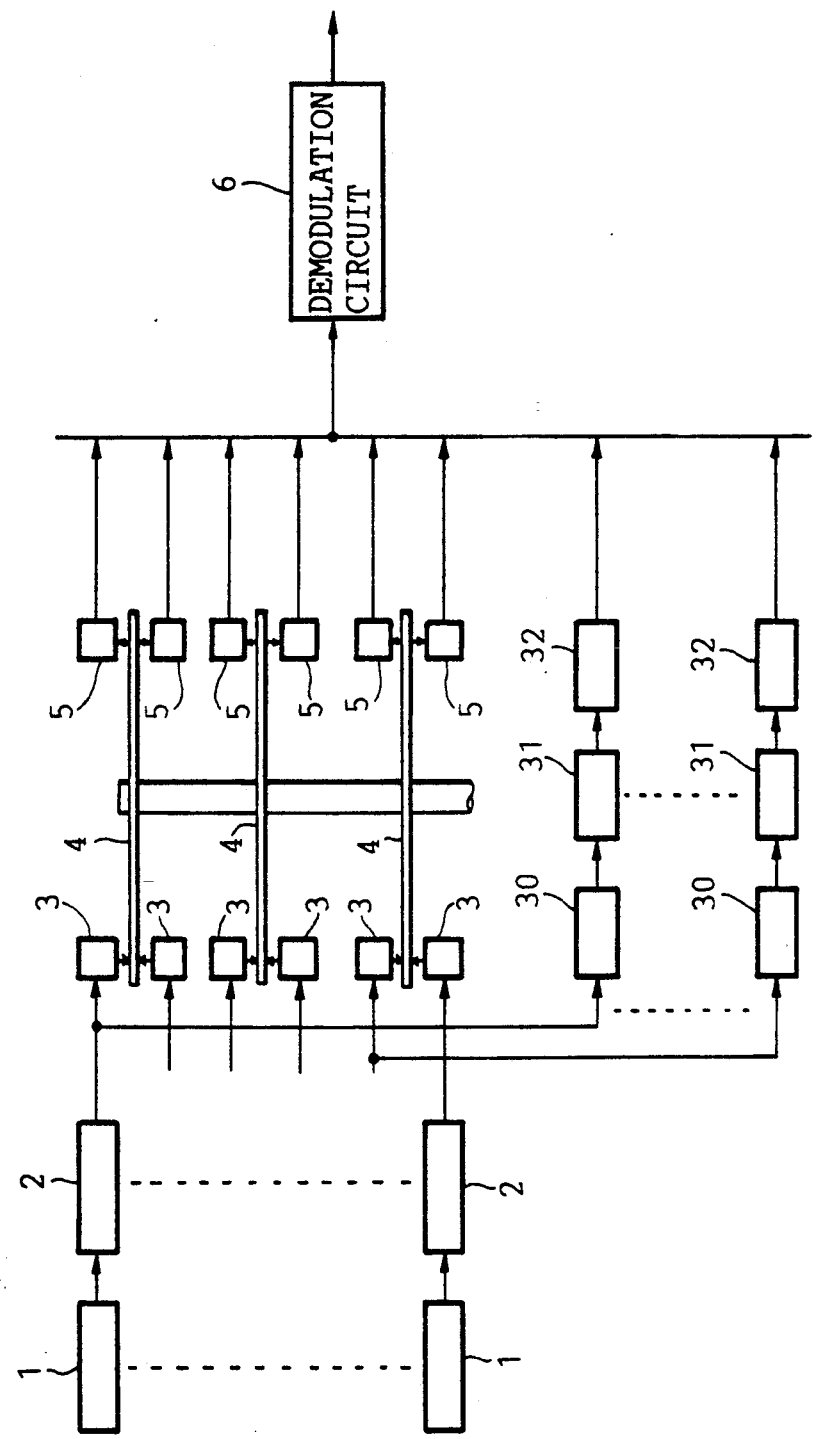
FIG. 3 is a block diagram showing the video recording apparatus according to a modified example of the first embodiment.

The first embodiment provides a single pair of the write head driving circuit 3 and read pick-up drive 5, by which the television program of one channel is to be recorded. Instead, it is possible to provide plural pairs, by which the television programs of plural channels can be simultaneously recorded. For example, as shown in FIG. 3, the first embodiment can be re-designed to provide plural magneto-optic disks each providing with a pair of write head driving circuit and read pick-up drive. Further, plural television tuners, FM circuits, binary circuits, RAMs and read control circuits can be provided. Thus, it is possible to configure the television system which can continuously record the plural videos of previous 30 minutes in plural channels (e.g., six channels).

Meanwhile, in the case where the video data in the non-video-recording period of the write head driving circuit 3 is not needed, it is possible to simplify the system configuration by omitting the binary circuit 30, RAM 31 and read control circuit 32.

[B] SECOND EMBODIMENT

(1) Description of Second Embodiment

Figure 4:
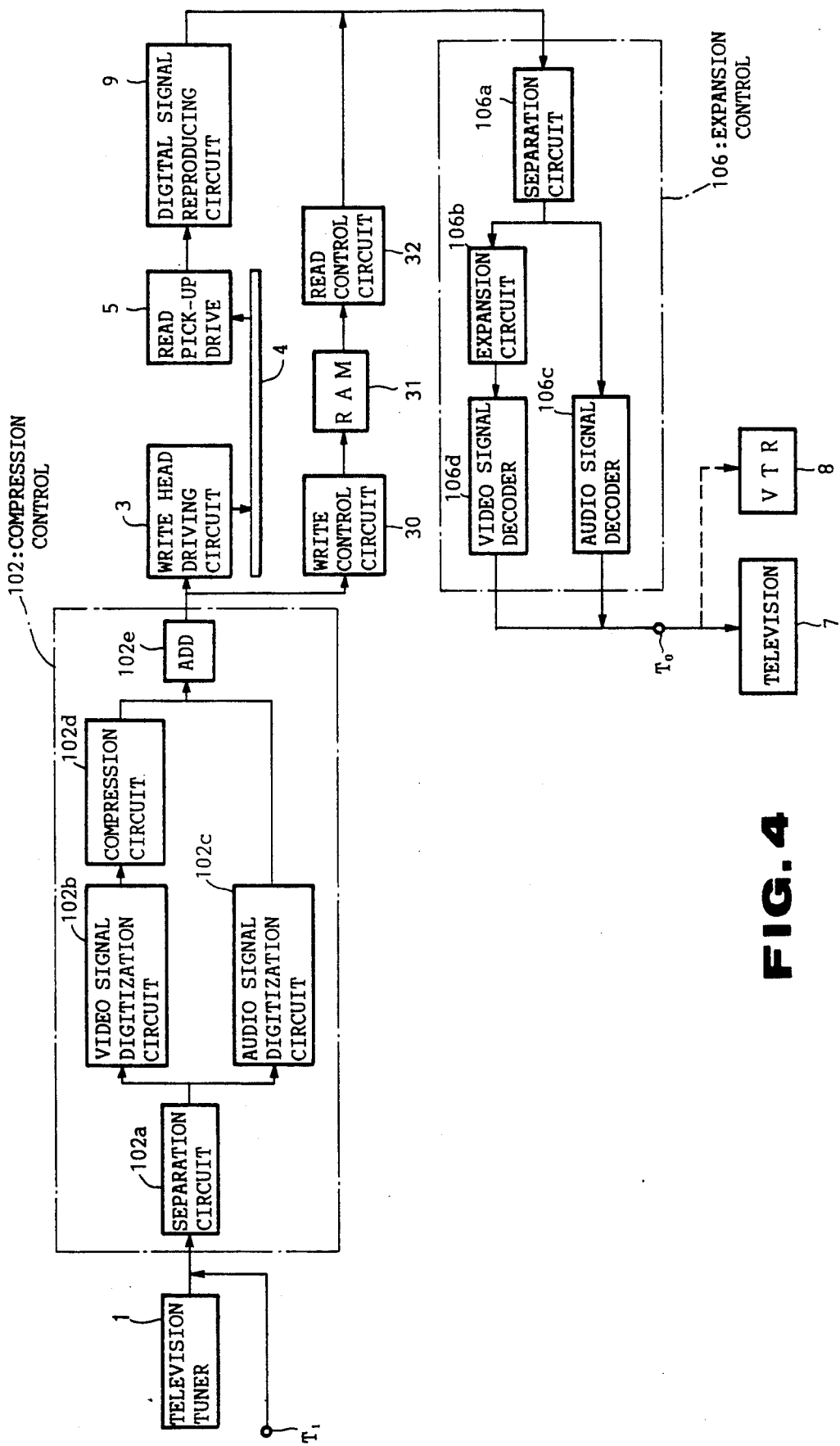
FIG. 4 is a block diagram showing a whole configuration of a television system employing the video recording apparatus according to a second embodiment.
Figure 5:
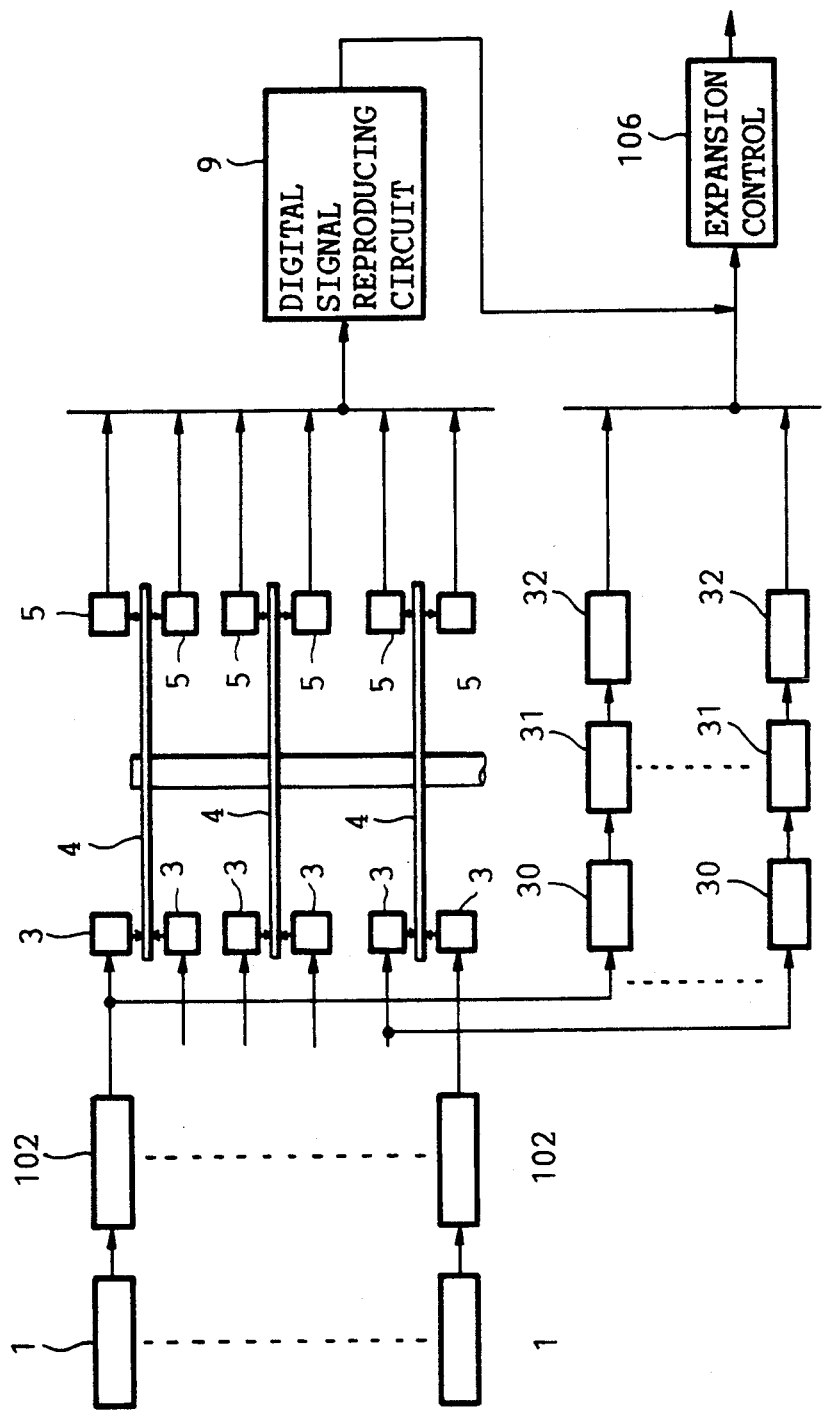
FIG. 5 is a block diagram showing the video recording apparatus according to a modified example of the second embodiment.

The second embodiment as shown in FIG. 4 is characterized by providing a compression control 102 and an expansion control 106 as comparing to the first embodiment shown in FIG. 1, wherein the description of the similar parts between these embodiments will be omitted.

The compression control 102 includes a separation circuit 102a, a video signal digitization circuit 102b, an audio signal digitization circuit 102c, a compression circuit 102d and an adder 102e. At first, the signal fed to the terminal T1 and the video/audio signal outputted from the television tuner 1 are fed to the separation circuit 102a wherein these signals are separated into the video signal and audio signal. This video signal is fed to the video signal digitization circuit 102b wherein the video signal is digitized into the video data, while the audio signal is fed to the audio signal digitization circuit 102c wherein the audio signal is digitized into the audio data. The compression circuit 102d compresses the video data. In this compression circuit 102d, several kinds of compressions are made based on the spectrum, spatial frequency, time and the like. Then, such compressed video data is fed to a first input of the adder 102e, while the audio data is fed to a second input of the adder 102e. This adder 102e adds the video data and audio data together to generate digital data, which is then fed to the foregoing write head driving circuit 3. This digital data is also fed to the foregoing write control circuit 30 so that the digital data will be stored in the RAM 31 as described before.

Then, as described before in the description of FIG. 2, the digital data is recorded on the disk 4. Thereafter, the recorded digital data is read by the read pick-up drive 5. The output signal of this read pick-up drive 5 is fed to a digital signal reproducing circuit 9 wherein this signal is reproduced into the digital data. In addition, the read control circuit 32 reads the digital data from the RAM 31.

The above digital signal is fed to the expansion control 106 which includes a separation circuit 106a, an expansion circuit 106b, an audio signal decoder 106c and a video signal decoder 106d. The separation circuit 106a separates the digital data into the foregoing compressed video data and audio data. The compressed video data is fed to the expansion circuit 106b, while the audio data is fed to the audio signal decoder 106c. This expansion circuit 106b performs the data expansion on the compressed video data, wherein this data expansion is performed in accordance with the algorithm corresponding to the data compression performed by the compression circuit 102d. Thus, the compressed video data is expanded into the original video data, which is then fed to a video signal decoder 106d wherein the video data is converted into the analog video signal. This analog video signal is outputted to the terminal To. On the other hand, the audio signal decoder 106c converts the audio data into the analog audio signal, which is then outputted to the terminal To. The foregoing television 7 and VTR 8 can be connected to this terminal To.

(2) Modified Example of Second Embodiment

As similar to the modified example of first embodiment described before, it is possible to provide plural pairs of television tuners, compression controls, write head driving circuits, magneto-optic disks, read pick-up drives, write control circuits, RAMs and read control circuits. In this case, the output signals of read pick-up drives 5 are fed to the digital signal reproducing circuit 9 wherein these signals are reproduced into the digital data, which are then fed to the expansion control 106. In addition, the digital data outputted from the read control circuits 32 are also fed to the expansion control 106. This expansion control 106 expands the compressed video data within the digital data.

Above is the description of the preferred embodiments of the present invention. This invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. A video recording apparatus capable of recording at least video information on a recording medium comprising:
   (a) write control means for controlling a motion of a write head to write said video information on a track formed on said recording medium in a writing direction which directs from a predetermined start position to a predetermined end position in said track, said write control means returning said write head to said predetermined start position of said track when said write head reaches at said predetermined end position of said track; and
   (b) read control means for controlling the motion of a read head which can move independently of said write head to read said video information from a designated position of said track in said writing direction.

2. A video recording apparatus capable of recording at least video information on a recording medium comprising:
   (a) write control means for controlling a motion of a head to write said video information on a track formed on said recording medium in a writing direction which directs from a predetermined start position to a predetermined end position in said track, said write control means returning said head to said predetermined start position of said track when said head reaches at said predetermined end position of said track;
   (b) read control means for controlling the motion of said head to read said video information from a designated position of said track in said writing direction;
   (c) memory means for storing said video information during a period between a first time when said head writes said video information at said predetermined end position of said track and a second time when said head starts to write said video information at said predetermined start position of said track; and
   (d) means for outputting said video information read from said memory means instead of said video information read from said recording medium in a period between a third time when said video information at said predetermined end position of said track is outputted and a fourth time when said video information at said predetermined start position of said track is started to be outputted.

3. A video recording apparatus according to claim 1 or 2 wherein said recording medium is a magneto-optic disk.

4. A video recording apparatus according to claim 1 or 2 wherein said predetermined start position is an innermost side of said track and said predetermined end position is an outermost side of said track.

5. A video recording apparatus according to claim 2 wherein said memory is constructed by a semiconductor memory.

6. A video recording/reproducing apparatus capable of recording/reproducing at least a video information on a recording medium comprising:
   (a) compressing means for compressing digitized video data indicative of said video information into compressed video data;
   (b) write means for generating a write signal based on said compressed video data, said write means controlling a motion of a head to write said write signal on a track formed on said recording medium in a writing direction which directs from a predetermined start position to a predetermined end position in said track, said write means returning said head to said predetermined start position of said track when said head reaches at said predetermined end position of said track;
   (c) read means for controlling the motion of said head to read said compressed video data from a designated position of said track in said writing direction;
   (d) reproducing mean for reproducing said compressed video data based on an output signal of said read means; and
   (e) expanding means for expanding said compressed video data from said reproducing means,
   whereby said video information is to be reproduced based on video data outputted from said expanding means.

7. A video recording/reproducing apparatus capable of recording/reproducing at least a video information on a recording medium comprising:
   (a) compressing means for compressing digitized video data indicative of said video information into compressed video data;
   (b) write means for generating a write signal based on said compressed video data, said write means controlling a motion of a head to write said write signal on a track formed on said recording medium in a writing direction which directs from a predetermined start position to a predetermined end position in said track, said write means returning said head to said predetermined start position of said track when said head reaches at said predetermined end position of said track;
   (c) read means for controlling the motion of said head to read said compressed video data from a designated position of said track in said writing direction;
   (d) reproducing means for reproducing said compressed video data based on an output signal of said read means;
   (e) expanding means for expanding said compressed video data from said reproducing means;
   (f) memory means for storing said compressed video data during a period between a first time when said head writes said write signal at said predetermined end position of said track and a second time when said head starts to write said write signal at said predetermined start position of said track; and
   (g) means for outputting said compressed video data from said memory means to said expanding means instead of said compressed video data from said reproducing means in a period between a third time when said read means reads out said compressed video data at said predetermined end position of said track and a fourth time when said read means starts to read out said compressed video data at said predetermined start position of said track,
   whereby said video information is continuously reproduced based on video data outputted from said expanding means.

8. A video recording/reproducing apparatus according to claim 6 or 7 wherein said recording medium is a magneto-optic disk.

9. A video recording/reproducing apparatus according to claim 6 or 7 wherein said predetermined start position is an innermost side of said track and said predetermined end position is an outermost side of said track.

10. A video recording/reproducing apparatus according to claim 7 wherein said memory means is constructed by a semiconductor memory.

11. A television system employing a video recording/reproducing apparatus capable of recording/reproducing at least video information outputted from a television tuner on a recording medium comprising:
   (a) write control means for controlling a motion of a head to write said video information on a track formed on said recording medium in a writing direction which directs from a predetermined start position to a predetermined end position in said track, said write control means returning said head to said predetermined start position of said track when said head reaches at said predetermined end position of said track;
   (b) read control means for controlling the motion of said head to read said video information from a designated position of said track in said writing direction; and
   (c) selecting means for selectively outputting one of said video information from said television tuner and said video information read by said read control means,
   whereby a display unit said television system displays pictures corresponding to said video information outputted from said selecting means.

12. A television system employing a video recording/reproducing apparatus capable of recording/reproducing at least video information outputted from a television tuner on a recording medium comprising:
   (a) write control means for controlling a motion of a head to write said video information on a track formed on said recording medium in a writing direction which directs from a predetermined start position to a predetermined end position in said track, said write control means returning said head to said predetermined start position of said track when said head reaches at said predetermined end position of said track;
   (b) read control means for controlling the motion of said head to read said video information from a designated position of said track in said writing direction;
   (c) memory means for storing said video information during a period between a first time when said head writes said video information at said predetermined end position of said track and a second time when said head starts to write said video information at said predetermined start position of said track;
   (d) means for outputting said video information read from said memory means instead of said video information read from said recording medium in a period between a third time when said video information at said predetermined end position of said track is outputted and a fourth time when said video information at said predetermined start position of said track is started to be outputted; and
   (e) selecting means for selectively outputting one of said video information from said television tuner and said video information from said read control means or said means,
   whereby a display unit said television system displays pictures corresponding to said video information outputted from said selecting means.

13. A television system according to claim 11 or 12 wherein said recording medium is a magneto-optic disk.

14. A television system according to claim 11 or 12 wherein said predetermined start position is an innermost side of said track and said predetermined end position is an outermost side of said track.

15. A television system according to claim 12 wherein said memory means is constructed by a semiconductor memory.

* * * * *